June 7, 1949.                    R. W. THOMAS                    2,472,236
                              HYDRAULIC BOOST DEVICE
                              Filed Sept. 13, 1946
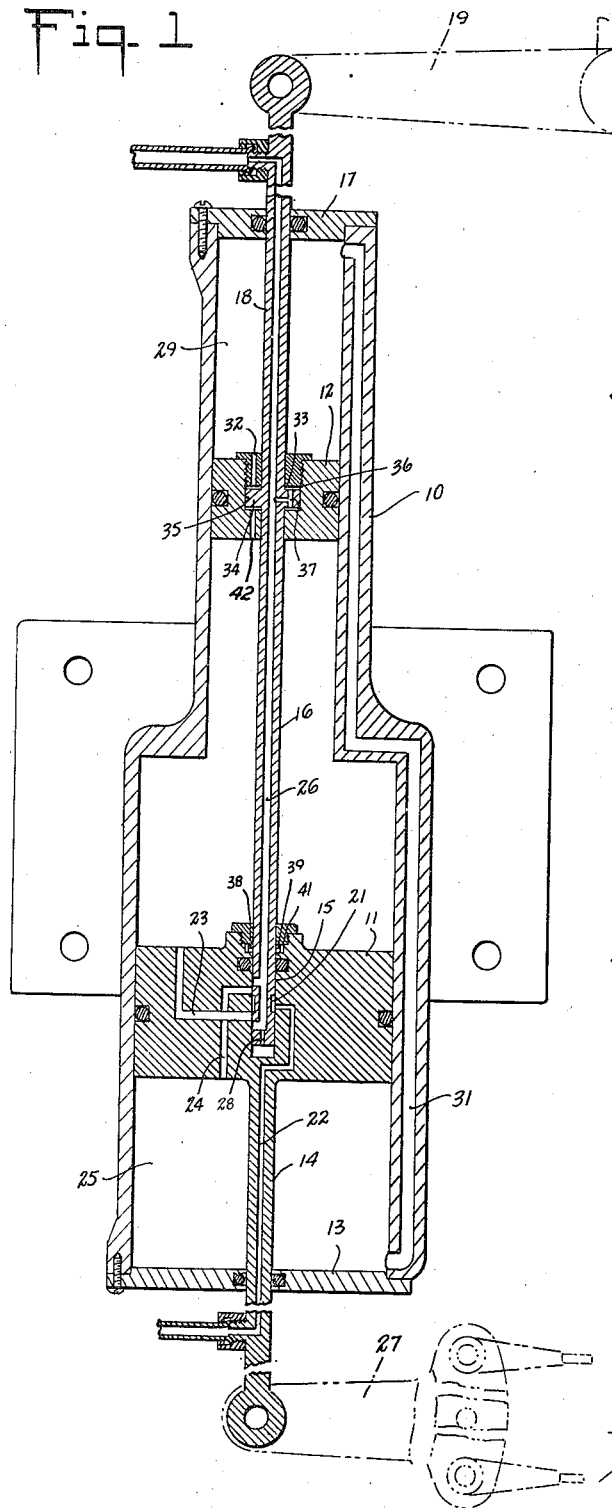
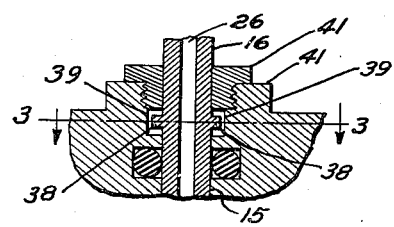
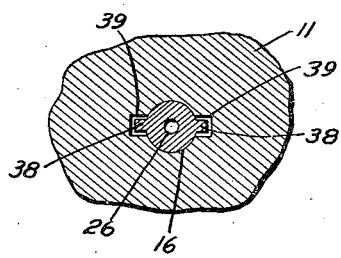
INVENTOR.
ROBERT W. THOMAS,
BY
ATTORNEYS.

Patented June 7, 1949

2,472,236

UNITED STATES PATENT OFFICE 2,472,236

HYDRAULIC BOOST DEVICE

Robert W. Thomas, Grand Rapids, Mich.

Application September 13, 1946, Serial No. 696,681

4 Claims. (Cl. 121—41)

This invention relates to an aircraft control surface boost cylinder for use with aileron controls and the like utilized for the operation of aircraft.

It is an object of the present invention to provide a simple, compact and efficient boost device for use with aircraft.

It is another object of the invention to provide a boost device for aircraft wherein the fluid passages may be contained in the movable piston which communicates with the piston rods extending through the ends of the boost device casing and to which fluid supply and return hoses may be coupled whereby to simplify the structure and eliminate relatively movable valve parts.

According to the invention, the boost device carries a percentage of the load for the pilot throughout the entire movement of the ailerons. A small piston is used to impart a greater load through a large piston with a hydraulic medium. The small piston by reason of the hydraulic coupling with the large piston also gives the pilot a "feel" of the forces applied to the ailerons at all times whereby he has a "feel" of the reaction and response of the ailerons to his manipulations of the control stick of the aircraft. The differences in the travel of the two pistons within a common cylinder are taken care of by a valve located in the large piston, thereby to allow the large piston to follow the same movement and be moved through the same distance as the small piston which is actuated by the pilot through a system of control levers. The piston rod for the small piston extends through one end of the device, while the output piston rod for the larger piston extends through the opposite end of the device and is connected through appropriate linkage with the aircraft ailerons or control members. The fluid pressure supply is delivered through the large piston rod to the control valve within the large piston which is operated when the piston rod of the small piston is moved. A lost-motion connection is provided between the small piston and the piston rod therefor, thereby to provide movement of the control valve without requiring initial movement of the small piston. A bleed valve arrangement is provided in the small piston to prevent fluid from being trapped in the lost-motion chamber formed by the lost-motion connection and to prevent oil locks in the chambers between and on opposite sides of the pistons. The control valve in the large piston, depending on the position therein, is arranged to admit fluid under pressure to the proper side thereof to cause it to follow movement of the small piston.

For other objects and for a better understanding of the invention, reference may be had to the following detailed description taken in connection with the accompanying drawings, in which:

Figure 1 is a longitudinal cross-sectional view of the aircraft control surface boost device embodying the features of the present invention;

Figure 2 is an enlarged fragmentary view of the large piston shown in Figure 1 and illustrates the arrangement for preventing rotation thereof with respect to the extension rod from the small piston; and Figure 3 is a sectional view taken along the line 3—3 of Figure 2.

Referring now to the drawings, 10 represents an outer casing having two diameters, one for receiving a large piston 11 and the other for receiving a small piston 12. On the large end of the cylinder is a head plate 13 through which extends a piston rod 14 connected with the large piston 11. In the large piston 11 is a central bore 15 into which there is extended an extension 16 of a piston rod which connects with the small piston 12 and extends out of the small end of the cylinder through a head plate 17 thereon. The main portion of the piston rod for the small piston is indicated at 18 and to the end of this rod exteriorly of the cylinder there is connected a lever 19 adapted to operate the piston rod through the cylinder head 17. The lever 19 is connected through appropriate linkage to the pilot's cabin for operation by the pilot. A down movement of the rod 18 moves the extension 16 of the rod within the central bore 15 of the piston 11 a limited distance without first moving piston 12 by reason of the lost-motion connection of piston rod 18 therewith, as will appear more fully hereinafter. The lower end of the extension 16 within the bore 15 has an annular recess 21 through which oil under pressure passing upwardly through the piston rod 14 of the large piston 11 through a central passage 22 is passed. With the rod extension 16 moved downwardly into the bore, fluid under pressure from the annular recess 21 passes through passageway 23 in the large piston. The oil in the chamber between the pistons can never reach a pressure more than the applied pressure in the chamber because the large piston will move away from the small piston and stop the flow of oil from the passage 22 to the passage 23. It is accordingly a metering process which is effected to keep the piston 11 moving the same distance and speed as the piston 12.

As the piston 11 moves down, a passage 24 communicates with a chamber 25 and passage 26 in the piston rod extension 16, whereby to allow scavenging of the chamber 25. The passage 26 continues through the main body 18 of the piston rod and leaves the device at a point exteriorly of the small head plate 17. If the rod extension 16 is raised, as when it is desired to have an up movement of the piston 11, oil from the chamber between the two pistons will then pass in a reverse direction through the passageway 23 and be communicated with the central passage 26 of the rod extension 16. The passageway 24, on the other hand, will be put in communication with the annular recess 21 and receive oil under pressure for delivery to the chamber 25. The piston 11 will then be moved upwardly and an aileron control 27 will be operated in the reverse direction. In order to keep the oil from settling in the lower end of the bore 15, a drain passage 28 is provided in the end of the rod extension 16.

Oil locks cannot occur in the chamber 25 when piston 11 is moving down because the oil in addition to moving through the scavenging path 24—26 can move to a chamber 29 at the top of the cylinder through a passageway 31 in the cylinder casing and thence to the scavenging path 26 by way of the lost-motion chamber surrounding the aforementioned lost-motion connection between piston 12 and rod 18, presently to be described. Similarly, oil locks cannot occur in chamber 29 and in the chamber between the piston when the pistons are moving up for the reason that the small volume of fluid discharged from chamber 29 compared to the increase of volume of chamber 25 passes by way of passageway 31 into chamber 25 and the fluid in the chamber between the pistons in addition to being discharged by way of passageway 23 to scavenging passageway 26 can also be discharged to the aforementioned lost-motion chamber and thence to passageway 26.

Oil from the chamber 29 moves downwardly through a passage 32 in a plug element 33 in the piston 12. On the rod 18 there is provided an integral collar portion 34 lying within a recess 35 in the piston 12. With the collar portion in place, the plug 33 may be screwed into the recess 35. Never is the plug extended into the recess so as to lie flush with the collar portion, but is kept a distance from the same to provide a small annular space 36, whereby to provide for some axial play or lost-motion of the collar portion 34 within the recess or lost motion chamber 35. Oil which has entered the chamber 29 will pass through the passageway 32 in the plug to the annular recess 36 and thence through a passage 37 for communication with the passage 26 in the piston rod 18. Similarly, oil in the chamber between the pistons will pass through a passage 42 in piston 12, into recess 35, and thence through passage 37 to passage 26. This provides a bleed valve arrangement which allows the chamber 29 and the chamber between the pistons to bleed to prevent oil locks. The bleed valve arrangement also prevents oil in the lost-motion chamber or recess 35 from becoming trapped therein and thus insures movement of the rod extension 16 relative to the piston 11 whereby upon substantially effortless movement of the piston rod, the pilot may cause the greater percentage of the load to be carried by the boost device and upon the lost-motion being taken up, to have the "feel" of the forces applied to the load as provided by piston 12.

Collar portion 34 also serves as a valve to cut off passages 32 and 42 as the collar portion is moved into seating engagement with plug 33 and the bottom of recess 35 respectively. Thus, a portion of the pressure fluid is prevented from leaking out through passages 31, 32, 37, and 26 when the pistons 11 and 12 are moving up, and a portion of the pressure fluid is prevented from leaking out through passages 42, 37, and 26 when the pistons are moving down. The clearance of the collar portion 34 with the plug is approximately $10/1000$ of an inch, and insufficient to cause any trouble in the control linkages.

On the extension 26 is a non-circular collar portion 38 fitted into the non-circular bottom portion of a recess 39 in the top of the piston 11. The recess 39 is of such length as to provide movement of the collar portion 38. A plug 41 is connected to the recess to limit the movement of the collar portion and the non-circular configuration thereof and of matching recess 39 providing a lock to prevent rotation of the valve extension 26 in the piston 11 and to give a mechanical linkage connection between the pistons in the case of hydraulic pressure failure.

While various changes may be made in the details of construction, it shall be understood that such changes shall be within the spirit and scope of the present invention as defined by the appended claims.

I claim:

1. A boost cylinder device comprising a casing having portions of two different diameters, a large piston operating in the large diameter portion, and a small piston operating in the small diameter portion, piston rods respectively connected with the pistons and extending respectively through the ends of the cylinder casing, the piston rod of the small piston having a lost-motion connection therewith and an extension connecting with the large piston, said large piston having a small bore for receiving the rod extension, said rod extension serving as a valve element for controlling the flow of fluid from a high pressure passage within the large piston to opposite sides of the large piston depending upon the position of the valve element within the bore of the large piston, said lost-motion connection forming a lost-motion chamber within the small piston and permitting movement of the rod extension in the large piston to position said valve element therein without initially moving the small piston, a fluid return passage in the rod extension and through the piston rod of the small piston for exit of the fluid therefrom at a point exteriorly of the casing, and a bleed valve arrangement associated with the piston rod of the small piston and within the small piston for bleeding fluid into said fluid return passage from said lost-motion chamber.

2. A boost cylinder device comprising a casing having portions of two different diameters, a large piston operating in the large diameter portion, and a small piston operating in the small diameter portion, piston rods respectively connected with the pistons and extending respectively through the ends of the cylinder casing, the piston rod of the small piston having an extension connecting with the large piston, said large piston having a small bore for receiving the rod extension, said rod extension serving as a valve element for controlling the flow of fluid from a high pressure passage within the large piston to opposite sides of the large piston depending upon the position of the valve element within the bore of the large piston, a fluid return passage in the rod extension and through the piston rod of the small piston for exit of the fluid therefrom at a point exteriorly of the casing, and a bleed valve arrangement associated with the piston rod of the small piston and within the small piston, said bleed valve arrangement comprising a collar portion on the piston rod of the small piston, said collar portion having a passage communicating with the central passage of the piston rod of the small piston, said small piston having a recess for receiving the collar portion, a closure member for closing the recess about the piston rod of the small piston, said closed recess being of sufficient axial depth to allow a small amount of play of the collar portion therewithin, and passageways within the combined small piston and closure member for permitting the flow of fluid from opposite sides of the small piston and from said closed recess to the central passage of the piston rod.

3. A boost cylinder device comprising a casing having portions of two different diameters, a large piston operating in the large diameter portion, a small piston operating in the small diameter portion, piston rods respectively connected with the pistons and extending respectively through the ends of the cylinder casing, the piston rod of the small piston having an extension connecting with the large piston, said large piston having a small bore for receiving the rod extension, said rod extension serving as a valve element for controlling the flow of fluid from a high pressure passage within the large piston to opposite sides of the large piston depending upon the position of the valve element within the bore of the large piston, said lost-motion connection forming a lost-motion chamber within the small piston and permitting movement of the rod extension in the large piston to position said valve element therein without initially moving the small piston, a fluid return passage in the rod extension and through the piston rod of the small piston for exit of the fluid therefrom at a point exteriorly of the casing, a bleed valve arrangement associated with the piston rod of the small piston and within the small piston for bleeding fluid into said fluid return passage from said lost-motion chamber, and a locking device associated with the large piston to provide a mechanical connection between the rod extension and the piston for use at times of hydraulic pressure failure.

4. A boost cylinder device comprising a casing having portions of two different diameters, a large piston operating in the large diameter portion, and a small piston operating in the small diameter portion, piston rods respectively connected with the pistons and extending respectively through the ends of the cylinder casing, the piston rod of the small piston having a lost-motion connection therewith and an extension connecting with the large piston, said piston having a small bore for receiving the rod extension, said rod extension serving as a valve element for controlling the flow of fluid from a high pressure passage within the large piston to opposite sides of the large piston depending upon the position of the valve element within the bore of the large piston, said lost-motion connection forming a lost-motion chamber within the small piston and permitting movement of the rod extension in the large piston to position said valve element therein without initially moving the small piston, a fluid return passage in the rod extension and through the piston rod of the small piston for exit of the fluid therefrom at a point exteriorly of the casing, a bleed valve arrangement associated with the piston rod of the small piston and within the small piston for bleeding fluid into said fluid return passage from said lost-motion chamber, and a locking device associated with the large piston to provide a mechanical connection between the rod extension and the piston for use at times of hydraulic pressure failure, said locking device comprising a collar portion upon the rod extension, said piston having a recess for receiving the collar portion, a closure member for the recess serving as a stop for the collar portion when the extension rod is moved in one direction, the bottom of the recess providing the stop when the piston rod is moved in the opposite direction, and projection means within the large piston recess cooperating with the collar portion for preventing the rotation of the piston upon the valve rod extension.

ROBERT W. THOMAS.

REFERENCES CITED

The following references are of record in the file of this patent:

UNITED STATES PATENTS

| Number | Name | Date |
| --- | --- | --- |
| 2,376,804 | Orshansky | May 22, 1945 |
| 2,393,585 | Bovnton | Jan. 29, 1946 |